United States Patent Office 3,410,744
Patented Nov. 12, 1968

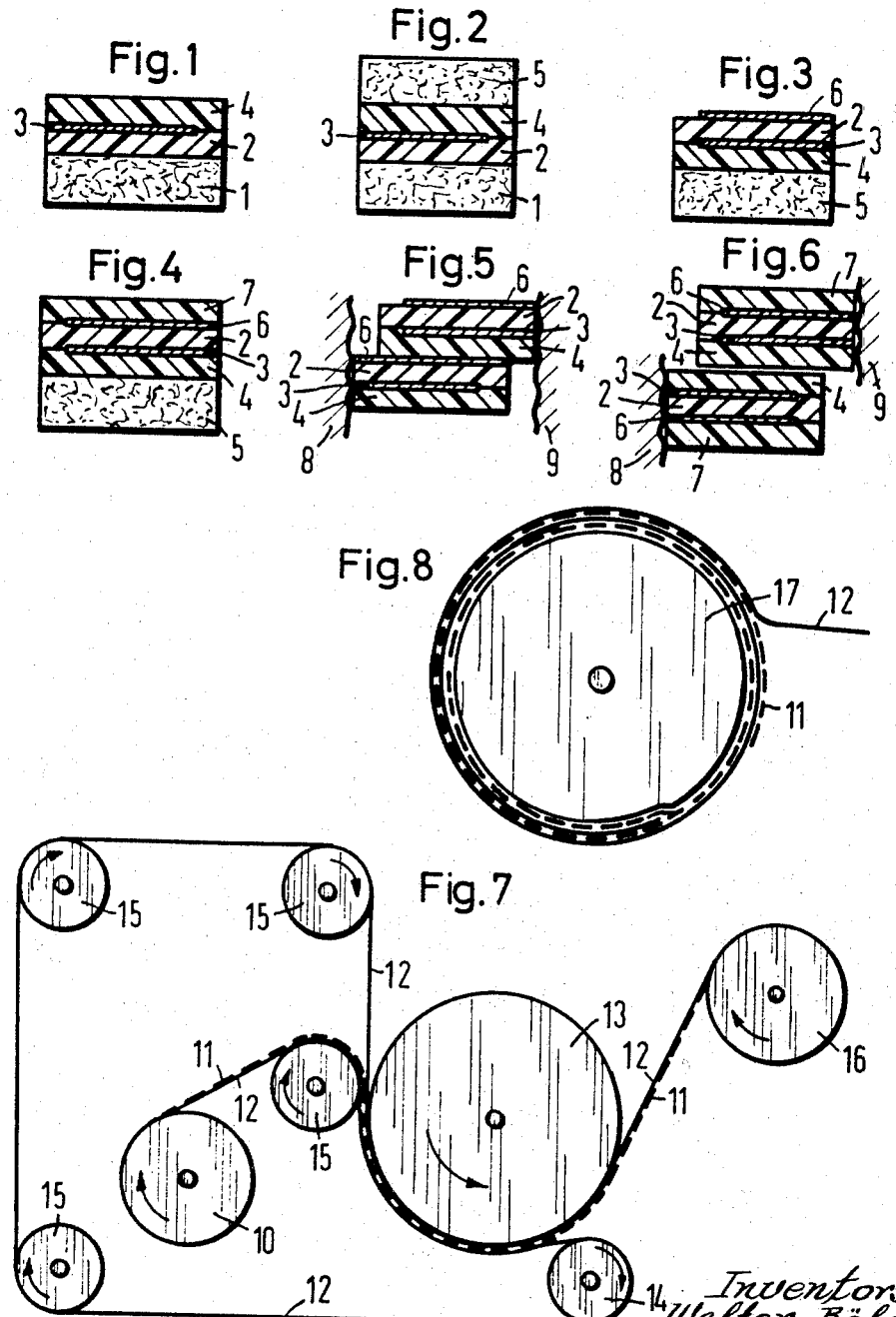

3,410,744
PROCESS FOR THE PRODUCTION OF THIN CAPACITOR BANDS
Walter Böld, Munich, Manfred Baumann, Munich-Solln, Hermann Schill, Munich, and Walter Volki, Grundwald, near Munich, Germany, assignors to Siemens Aktiengesellschaft, Munich, Germany
Filed Dec. 21, 1964, Ser. No. 420,490
Claims priority, application Germany, Dec. 23, 1963, S 88,861
5 Claims. (Cl. 156—233)

ABSTRACT OF THE DISCLOSURE

This invention is directed to a method of manufacturing capacitor strips for regenerative capacitors wherein vaporized metal layers are applied to both sides of a lacquer layer, and which lacquer layer has good regenerative properties.

---

The present invention relates to a process for the production of thin capacitor bands formed of lacquer layers and metal layers, in which a lacquer layer is applied to a subsequently detached carrier band, to which lacquer layer a metal layer is applied, preferably vaporized on, and if desired, to which further lacquer and metal layers may be applied.

It is a known practice to make the first lacquer layer of material of good regenerative capacity, while the second lacquer layer can then consist of a material with especially good dielectric properties, but, on the other hand, poor regenerative capacity. It is possible, then to so arrange four such bands that in each case the metal layers of two bands are connected with one another in such a manner that two lacquer layers with poor dielectric properties but good regenerative capacity, are disposed therebetween. The metal layers are so connected with one another that such intermediate lacquer layers lie in the field-free space, while the lacquer layers with good dielectric properties alone form the dielectric of the capacitor. Such a capacitor has extraordinarily good electrical properties and, as compared with electrical condensers with similarly good dielectric properties, extremely high unit capacitance.

The present invention has as its special problem, that of again increasing the unit capacitance of such capacitors without its being necessary to accept therewith poorer other electrical properties.

For this purpose there is proposed a process for the production of this capacitor bands formed of lacquer layers and metal layers, in which a lacquer is applied to a subsequently-detached carrier band, to which lacquer layer is applied a metal layer, preferably vaporized on, and to which, if desired, further lacquer and metal layers may be applied. In such process, according to the invention, onto the exposed surface, thus far not connected to a carrier band, of the thin-foil band consisting of lacquer layers and metal layers, there is applied an auxiliary carrier band and the carrier band originally carrying the thin foil band is detached therefrom. The surface of the thin foil band previously connected with the original carrier band is then metallized, preferably vapor-treated with metal.

If the metal layer applied to the first lacquer layer before such backing operation, and the metal coating applied to the back or opposite surface of such first lacquer layer, after the backing operation, are so arranged that both metal coatings extend to and along one longitudinal side edge of the thin-band foil, as cut up into winding widths, in subsequent contacting of the electrodes or plates of the capacitor by spraying metal on the end faces of the capacitor assembly, these two metal layers are conductively connected to one another, so that such first lacquer layer lies in the field-free space.

Such an arrangement yields a number of advantages. Since, as is well known, the underlayer, onto which the one metal layer is applied, especially by vaporization, is constantly penetrated with metal points which extend, proceeding from the metal coating, into the underlayer, the break-down strength of the vaporized-on lacquer layers of a thin-foil band is continuously reduced throughout the band. In a capacitor, produced according to the invention, this penetration exists solely in such first lacquer layer, unless the capacitor band contains, besides the metal layers applied on both sides of the first lacquer layer, still further metal layers. As a rule, therefore, other than the first lacquer layer, which is not electrically stressed, as a result of the connection of the two adjacent metal layers, all the other lacquer layers are point free and therefore have an extremely high breakdown strength. There thus is the possibility, according to the process of the invention, to construct electrical capacitors with very thin dielectric layers and, accordingly, capacitors having high capacitance per unit of volume. There is, furthermore, the possibility of making the first lacquer layer, which is arranged in the field-free space, of materials with especially good regenerative capacity, as, for example, nitrocellulose, ethyl cellulose, acetyl cellulose, benzyl cellulose, acetobutyrate and the like, especially cellulose derivatives. In general, it can be stated that the regenerative capacity of the capacitor can be favorably influenced by forming the first lacquer layer, disposed in the field-free space, of a material which contains in its molecule at least 10% of the oxidizing agent necessary for its complete conversion into stable oxidation products. The other dielectrically charged lacquer layers can then be made of materials with especially good dielectric properties and, indeed, even if they have only very poor regenerative properties, such as, for example, polystyrene. Under some circumstances, to be sure, other considerations too, may be decisive for the choice of the raw materials to be used for the various lacquer layers. If, for example, the raw materials used for the dielectrically utilized lacquer layers are of such nature that they assure a sufficient regenerative capacity of the capacitor, then as raw lacquer material for the production of the first lacquer layer, a material can be used which facilitates the production and processing of this lacquer layer or of the capacitor band. For this purpose, there come under consideration, especially materials with high tearing strength, low shrinkage, thermal form stability, easy lacquerability, metallizability etc. For example, it is then possible to use polyamides, polyacrylates, polyurethanes and polyesters.

A still higher unit capacitance is obtained if the metal layers applied from both sides of the first lacquer layer are so arranged offset against one another that, after the cutting up into winding web widths, the one metal layer extends to the edge at one longitudinal side edge of the thin-foil band, the other metal layer to extend to the other longitudinal side edge of the thin-foil band. In the respective contacting of these two metal layers, the first lacquer layer will then not lie in the field-free space, but will be dielectrically effective. This arrangement permits the production of a capacitor of very high unit capacity from only a single thin-foil band if there is applied to one of the two metal layers, by lacquering or otherwise attaching thereto, an additional dielectric layer. The thickness of this further dielectric layer can be considerably less than that of the first lacquer layer, since it is not pierced by metal points and, therefore, has a considerably higher breakdown resistance. The thickness of such second lacquer layer in comparison to the first lacquer layer can, in particular, be such that both lacquer layers have an approximately equal breakdown strength.

It is apparent from the above that the process of the invention makes it possible to produce a whole series of new and advantageous forms of capacitors, the properties of which are superior to those of capacitors that can be produced by prior known processes.

The attachment of the thin foil, supported on one carrier band, onto another carrier band can be accomplished, for example, by the method that first there is applied to the free or exposed surface of the thin foil band, preferably under action of heat, a new auxiliary carrier and thereafter the carrier originally supporting the thin foil band is detached therefrom. It is also possible to reapply the thin foil band to the back of the original carrier. The previously used carrier band can thereby be further utilized. The reapplication of the thin foil band from the one side of the carrier band to its other side can also be accomplished in an especially simple manner by the method that the thin foils on the carrier band are rolled upon a supply roller and then so drawn off from the roller that the connection previously existing with the carrier band is released and the thin foils, in each case, are disposed on the next following convolution of the carrier band. It is then possible to conduct the carrier band, and the thin foils so disposed thereon over a heated laminating roller which efficiently heats the two bands that an attachment takes place.

Under some circumstances it is expedient to apply to the free surface of the thin foil band instead of a carrier band which is subsequently removed, an insulating band which remains connected with the thin foil band and is therewith wound into the capacitor, thus forming a part of the dielectric. If one here proceeds from a thin foil band which consists of a lacquer layer metallized on both sides, the two metal coatings being so arranged that they are conductively connected with one another in the capacitor, an insulating band applied in place of an auxiliary carrier band and cooperable with an identically constructed capacitor band used as a counterelectrode forms the sole dielectric of the capacitor.

As carrier band, both for the production of the thin foil band by application of one or more lacquer coatings and metallizing of the same and also for the auxiliary carrier band for the rebacking process, there have proved to be suitable for the purpose paper bands impregnated with high melting hydrocarbons, particularly hard wax, polyethylene or paraffin, possibly with addition of adhesives, such as polyisobutylene, but however, for the rebacking operation and also for the production of the thin foil band, or for one of the two purposes, it is possible to use a plastic carrier band, as for example, a cellophane band.

It should also be mentioned that both for the production of the first lacquer layer metallized on both sides and also, possibly for additional lacquer layers applied thereto, there exists the possibility of applying them not only from a lacquer solution, but of also producing lacquer layers by other processes, such as, by glow polymerization, for example, by glow polymerization from ethylene under the action of the electric glow field it is possible to produce polyethylene layers of very low thickness. In a similar manner, other polymeric plastics be produced from other monomers.

The two metal coatings applied to the first lacquer layer also can be subdivided, by an insulating strip pattern, which can be produced according to any desired known process, in such a way that the energy liberated in a regenerating breakdown is limited. Such a subdivision can be produced, as proposed already in another place, also by the method that over the metal coating a lacquer layer is applied which swells or dissolves to such an extent the material situated under the metal covering that the metal covering, after evaporation of the solvent has a micro-crack pattern. In this case, it is expedient to form the lacquer layers arranged over the metal coating in such a way that they leave free the border zone of the metallization, which is preferably reinforced and which is later contacted by spraying on of metal onto the face ends of the condenser.

For a further explanation of the invention reference is made to the drawings in which:

FIGS. 1–3 illustrate successive steps in the practice of the invention;

FIG. 4 illustrates an additional step;

FIG. 5 illustrates, in section, an assembly of bands such as illustrated in FIG. 3, following removal of the auxiliary carrier band;

FIG. 6 illustrates an assembly, in section, of bands such as illustrated in FIG. 4, following removal of the auxiliary carrier band;

FIG. 7 diagrammatically illustrates an apparatus for effecting transfer of the thin foil band from one side to the other of a carrier band; and FIG. 8 illustrates another manner in which the transfer of the thin foil band can be accomplished.

FIGS. 1 to 3 illustrates the principle of the process of the invention. In FIG. 1 a lacquer coating 2 is applied on a carrier band 1. Upon this there is applied a metallization 3, and over the metallization 3 there is applied a further lacquer laying 4. The applying of lacquer layer 4 is not absolutely necessary. Moreover, there exists also the possibility of applying thereto, instead of the lacquer layer 4, a dielectric band. FIG. 2 illustrates the commencement of the backing operation, in which an auxiliary carrier band 5 is applied to the lacquer layer 4, whereupon, as shown in FIG. 3, the carrier band is then detached and the lacquer layer 2 is provided on its exposed unmetallized side with a metal coating 6. The metal coating 6 is illustrated in FIG. 3 as extending to the same edge as metal layer 3, so that upon an end face contacting of the metal layers, the lacquer coating 2 lies in the field free space therebetween. On the other hand, with an offset or staggered arrangement of the metal layer 6, with respect to the layer 3, which is likewise possible, the lacquer layer 2 remains dielectrically active. It should also be pointed out that the sequence represented in FIGS. 1 to 3 of the backing and releasing process is not absolutely necessary, it being on the contrary also possible to carry out the attachment of the carrier band 5 and the releasing of carrier band 1 in reverse sequence or simultaneously. If the detachment of carrier band 1 takes place before the application of carrier band 5, however, care must then be taken that any free conduction of the thin foil band is avoided.

As illustrated in FIG. 4, after the application of the metal layer 6 to the lacquer layer 2 there can be applied over such metal layer a further lacquer coating 7. It is then possible from two such capacitor bands, such as illustrated in FIG. 4, still attached with the carrier band 5, to produce a two-layer capacitor, such as illustrated in FIG. 6, while by superimposing two bands of the type illustrated in FIG. 3, there may be produced a capacitor, the winding layer of which is illustrated in FIG. 5. By application of end face contact layers 8 and 9, in each case the metal layers 3 and 6 are conductively connected with one another. It is especially expedient in each case to make the lacquer layers 2 of a material with good regenerative properties, that is, with an oxidation balance above 10%, as for example, of acetyl cellulose, ethyl cellulose, etc., while the lacquer layers 4 can consist of a material with good dielectric properties, such as polystyrene. If the operating voltage of the condenser is to be relatively high, so that the strength of the dielectric layers 4 has to be very great, it will generally be expedient, instead of making these dielectric layers 4 by a lacquering process, to utilize a finished dielectric band. A two-layer capacitor is obtained, as heretofore explained, from two capacitor bands such as are represented in FIG. 4 if these are arranged as shown in FIG. 6. For this form of construction, the same considerations stated for the construction of FIG. 5 are also applicable.

With the aid of FIGS. 7 and 8 there will now be explained further possibilities for the utilization of the process according to the invention.

In FIG. 7, 10 represents a supply roll, on which there is disposed a carrier band 12 having a thin foil 11 thereon. The thin foil 11 and the carrier band 12 are conducted, after a carrier band 12 has been applied to the free or exposed upper side of thin foil 11, a backing roller 13, which is heated to a temperature of about 120° C. This temperature suffices, in the case of use of a paper band impregnated with hydrocarbons such as polyethylene, hard wax, paraffin, etc., and thin foil bands of acetyl cellulose, polystyrene, etc., to produce a sufficient adhesion therebetween. With use of carrier bands and thin foil bands of different compositions, the temperature must be correspondingly determined. After the backing operation, the portion of the carrier band 12 originally carrying the thin foil 11, is drawn off over the roller 14 separating the thin foil band 11 therefrom and after deflection over the rollers 15 is again supplied from the other side to the thin foil band 11 and, with the aid of the backing roller 13 is attached or bonded with the thin foil band 11. The thin foil 11, now applied to the other side of the carrier band 12, is then wound upon the supply roller 16.

FIG. 8 illustrates a further possibility for the execution of the process according to the invention. Here the thin foil band 11, together with the carrier band 12, is wound upon a supply roller 17. If, as in the example shown, the thin foil band lies inwardly on the supply roll 17 and the carrier band 12 outwardly, the carrier band 12 is initially shown off of the supply roll 17, with detachment of the same from the thin foil band 11, and it is then drawn off. After pulling off the first winding layer, together with the thin foil 11 lying on it, it is conducted over an attaching or backing roller, in order to again produce a good connection of the carrier band 12 with the thin foil 11, now lying on the other side of the carrier band.

Changes may be made within the scope and spirit of the appended claims which define what is believed to be new and desired to have protected by Letters Patent.

We claim:

1. A method of manufacturing capacitor strips for regenerative electric compactors, comprising the steps of: applying a first lacquer layer to a first auxiliary carrier, said first lacquer layer having good regenerative properties; vaporizing a first metal on the exposed surface of said first lacquer layer; applying a second lacquer layer over said first metal layer, said second lacquer layer having good dielectric properties; removing said first auxiliary carrier from said first lacquer layer; applying said second lacquer layer to a second auxiliary strip; and vaporizing a second metal layer on said first lacquer layer opposite said first metal layer.

2. A method of manufacturing capacitor strips according to claim 1 further including, applying a third lacquer layer over said second metal layer.

3. A method of manufacturing capacitor strips according to claim 1 wherein, said first auxiliary carrier together with said first lacquer layer, said first metal layer and said second lacquer layer is wound on a roll, and wherein said roll is unwound and said first auxiliary carrier is removed and applied to said second lacquer layer thereby forming said second auxiliary carrier.

4. A method of manufacturing capacitors according to claim 3 wherein, said auxiliary layer together with said first lacquer layer, said first metal film and said second lacquer layer is heated to a temperature of approximately 120° C., prior to removing said first auxiliary carrier from said first lacquer layer.

5. A method of manufacturing capacitor strips according to claim 1 wherein said first auxiliary carrier together with said first lacquer layer, said first metal layer and said second lacquer layer is wound into a roll with said first auxiliary carrier outermost on each layer of the roll and further including the step of drawing said first auxiliary carrier from said roll thereby releasing said first auxiliary carrier from said lacquer layer, and causing said first auxiliary carrier to adhere to said second lacquer layer, thereby exposing the opposite side of said first lacquer layer and forming said second auxiliary carrier.

References Cited

UNITED STATES PATENTS

| | | | |
|---|---|---|---|
| 3,123,895 | 3/1964 | Henninger et al. | 29—25.42 |
| 3,215,909 | 11/1965 | Schill et al. | 317—258 |
| 3,227,934 | 1/1966 | Schill | 317—260 |
| 3,248,620 | 4/1966 | Haft et al. | 317—260 X |
| 3,261,077 | 7/1966 | Meisinger | 29—25.42 |
| 3,278,816 | 10/1966 | Gaenge et al. | 317—258 |
| 3,289,269 | 12/1966 | Dauper | 29—25.42 |
| 3,306,798 | 2/1967 | Gaenge | 156—233 X |

EARL M. BERGERT, *Primary Examiner.*

T. R. SAVOIE, *Assistant Examiner.*